United States Patent
Feng et al.

(10) Patent No.: US 10,565,871 B2
(45) Date of Patent: Feb. 18, 2020

(54) METHOD AND DEVICE FOR REQUESTING FOR ROAD RIGHT

(71) Applicant: BOE Technology Group Co., Ltd., Beijing (CN)

(72) Inventors: Pengpeng Feng, Beijing (CN); Fan Yang, Beijing (CN); Xiao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/122,731

(22) Filed: Sep. 5, 2018

(65) Prior Publication Data

US 2019/0304299 A1    Oct. 3, 2019

(30) Foreign Application Priority Data

Mar. 29, 2018 (CN) .......................... 2018 1 0274004

(51) Int. Cl.
| | |
|---|---|
| *G08G 1/0965* | (2006.01) |
| *H04W 4/46* | (2018.01) |
| *H04W 4/12* | (2009.01) |
| *G08G 1/052* | (2006.01) |
| *G08G 1/04* | (2006.01) |

(52) U.S. Cl.
CPC ............ *G08G 1/0965* (2013.01); *G08G 1/04* (2013.01); *G08G 1/052* (2013.01); *H04W 4/12* (2013.01); *H04W 4/46* (2018.02)

(58) Field of Classification Search
CPC ..... G08G 1/096741; G08G 9/02; H04W 4/40; H04W 4/46; B60W 30/08; B60W 50/14; B60W 30/0956; B60W 30/18163; G06T 2207/30236; G01C 21/3658
See application file for complete search history.

(56) References Cited

U.S. PATENT DOCUMENTS

| | | | | |
|---|---|---|---|---|
| 2007/0229309 | A1* | 10/2007 | Tomita ............... | G01C 21/3691 340/992 |
| 2012/0083960 | A1* | 4/2012 | Zhu ...................... | G05D 1/0214 701/23 |
| 2013/0293394 | A1* | 11/2013 | Rubin ..................... | G08G 9/02 340/902 |
| 2016/0364823 | A1* | 12/2016 | Cao ........................ | G06Q 50/30 |
| 2018/0362032 | A1* | 12/2018 | Yang ..................... | B60W 30/09 |
| 2019/0051159 | A1* | 2/2019 | Wang .................. | G08G 1/0145 |

\* cited by examiner

*Primary Examiner* — Mirza F Alam
(74) *Attorney, Agent, or Firm* — McDermott Will & Emery LLP (57) ABSTRACT

The present disclosure discloses a method and device for requesting for a road right. The method for requesting for a road right comprises: judging whether a road section where a road right requesting vehicle is currently located is in a congestion state, and searching and screening requested vehicles within a predetermined range according to a direction for a lane change request and positioning information, to realize automatic searching and screening of the requested vehicles; and further establishing a communication connection with the selected requested vehicle, transmitting a road right occupation request to the selected requested vehicle, and performing a lane change operation when the selected requested vehicle agrees with the road right occupation request.

10 Claims, 6 Drawing Sheets

| License plate | Color | Vehicle model |
|---|---|---|
| 京QXXXXX1 | White | Volkswagen Golf |
| 京NXXXXX2 | Black | Mercedes GL500 |
| 京GXXXXX3 | Blue | Mazda 6 |
| ... | ... | ... |

Fig. 7

METHOD AND DEVICE FOR REQUESTING FOR ROAD RIGHT

CROSS-REFERENCE TO RELATED APPLICATION(S)

This application claims priority to the Chinese Patent Application No. CN201810274004.7, filed on Mar. 29, 2018, which is incorporated herein by reference in its entirety.

TECHNICAL FIELD

The present disclosure relates to the field of vehicle networking technologies, and more particularly, to a method and device for requesting for a road right.

BACKGROUND

With the development of society and economy, a number of motor vehicles in large cities has also increased, and an incidence rate of road traffic accidents has also increased. At the same time, a large number of novice drivers are generally unable to quickly complete lane change to avoid traffic accidents when they encounter the accidents due to inexperienced driving skills, which results in that a large number of rear vehicles are in congestion, and even some novice drivers may have scraping accidents with vehicles in other lanes during a lane change process, thereby increasing the congestion of the road.

In the event of traffic congestion, a lane change demand of an owner of a motor vehicle is difficult to achieve. If the owner of the motor vehicle forcibly changes a lane, an owner of an affected vehicle may be dissatisfied, and scraping accidents may occur frequently. If the owner of the motor vehicle waits in situ, vehicles in the rear of the motor vehicle may be bogged down.

SUMMARY

According to an aspect of the present disclosure, there is provided a method for requesting for a road right, comprising: judging whether a road section where a road right requesting vehicle is currently located is in a congestion state according to a driving state of the road right requesting vehicle; when it is determined that the road section where the road right requesting vehicle is currently located is in a congestion state and the road right requesting vehicle initiates a lane change request, screening requested vehicles according to a direction for the lane change request and positioning information; establishing a communication connection with a selected requested vehicle and transmitting a road right occupation request to the selected requested vehicle; and performing a lane change operation when the selected requested vehicle agrees with the road right occupation request.

In an example, screening requested vehicles according to a direction for the lane change request and positioning information comprises: search vehicles located within a predetermined area range according to the positioning information; and sequentially displaying vehicle information of the requested vehicles according to traveling directions of the requested vehicles in accordance with a front and rear positional relationship among the requested vehicles, wherein the vehicle information comprises a license plate, a vehicle color, and a vehicle type.

In an example, judging whether a road section where a road right requesting vehicle is currently located is in a congestion state comprises: monitoring a speed of the road right requesting vehicle, and when the speed is lower than a predetermined value for a period of time, determining that the road section where the road right requesting vehicle is currently located is in a congestion state. In an example, when a communication connection cannot be established with the selected requested vehicle or the selected requested vehicle does not agree to provide the road right, the method further comprises: transmitting the road right occupation request to a vehicle immediately in the rear of the selected requested vehicle.

In an example, transmitting a road right occupation request to the selected requested vehicle comprises: transmitting a voice request of a user to the selected requested vehicle; and transmitting a text request of the user to the selected requested vehicle, wherein the text request comprises a fee paid by the road right requesting vehicle for requesting for the road right.

In an example, after performing a lane change operation when the selected requested vehicle agrees with the road right occupation request, the method further comprises: paying the fee in the road right occupation request to the selected requested vehicle, and generating a payment record according to a payment date, an amount of the fee, and vehicle information of the requested vehicle; and storing the payment record and corresponding evaluation information in a history record at a cloud side, wherein the evaluation information comprises rating information of the road right requesting vehicle and the selected requested vehicle.

In an example, screening requested vehicles according to a direction for the lane change request and positioning information further comprises: acquiring history records of the selected requested vehicles from the cloud side, and selecting a requested vehicle having a score greater than a threshold according to rating information recorded in the history records.

In an example, the method further comprises: setting an upper limit value of the fee paid to the selected requested vehicle.

According to another aspect of the present disclosure, there is provided a device for requesting for a road right, comprising: a processor; and a memory coupled to the processor and storing instructions which, when executed on the processor, cause the processor to be configured to: determine whether a road section where a road right requesting vehicle is currently located is in a congestion state according to a driving state of the road right requesting vehicle; when it is determined that the road section where the road right requesting vehicle is currently located is in a congestion state and the road right requesting vehicle initiates a lane change request, screen requested vehicles according to a direction for the lane change request and positioning information; establish a communication connection with a selected requested vehicle and transmit a road right occupation request to the selected requested vehicle; and perform a lane change operation when the selected requested vehicle agrees with the road right occupation request.

In an example, the processor is further configured to: search vehicles located within a predetermined area range according to the positioning information; and sequentially display vehicle information of the requested vehicles according to traveling directions of the requested vehicles in accordance with a front and rear positional relationship among the requested vehicles, wherein the vehicle information comprises a license plate, a vehicle color, and a vehicle type.

In an example, the processor is further configured to: monitor a speed of the road right requesting vehicle, and when the speed is lower than a predetermined value for a period of time, determine that the road section where the road right requesting vehicle is currently located is in a congestion state.

In an example, the processor is further configured to: transmit the road right occupation request to a vehicle immediately in the rear of the selected requested vehicle.

In an example, the processor is further configured to: transmit a voice request of a user to the selected requested vehicle; and transmit a text request of the user to the selected requested vehicle, wherein the text request comprises a fee paid by the road right requesting vehicle for requesting for the road right.

In an example, the processor is further configured to: pay the fee in the road right occupation request to the selected requested vehicle, and generate a payment record according to a payment date, an amount of the fee, and vehicle information of the requested vehicle; and store the payment record and corresponding evaluation information in a history record at a cloud side, wherein the evaluation information comprises rating information of the road right requesting vehicle and the selected requested vehicle.

In an example, the processor is further configured to: acquire history records of the selected requested vehicles from the cloud side, and select a requested vehicle having a score greater than a threshold according to rating information recorded in the history records.

In an example, the processor is further configured to: set an upper limit value of the fee paid to the selected requested vehicle.

The above description is only an overview of the technical solutions of the present disclosure. In order to more clearly understand the technical solutions of the present disclosure, the technical solutions can be performed according to the content of the specification, and in order to make the above and other purposes, features and advantages of the present disclosure more obvious and easy to understand, specific embodiments of the present disclosure are specifically described below.

BRIEF DESCRIPTION OF THE DRAWINGS

Various other advantages and benefits will become apparent to those skilled in the art by reading the detailed description of the preferred embodiments below. The accompanying drawings are only for the purpose of illustrating the preferred embodiments and are not to be construed as limiting the present disclosure. Further, the same components are denoted by the same reference signs throughout the accompanying drawings. In the accompanying drawing.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth here. Rather, these embodiments are provided so that the present disclosure will be more fully understood, and the scope of the present disclosure can be fully conveyed to those skilled in the art.

Lane change is mainly realized depending on experienced driving skills of owners of motor vehicles, but novice drivers often take a long time to achieve lane change. Therefore, there is an urgent need to provide a novice driver with a method for requesting for a road right to meet a lane change demand of the novice driver when the road is in a congestion state. In view of the above problem, the present disclosure proposes a method and apparatus for requesting for a road right, primarily for the purpose of achieving orderly lane change of traveling vehicles, and alleviating traffic congestion caused by blind lane change of the vehicles.

Figure 1:
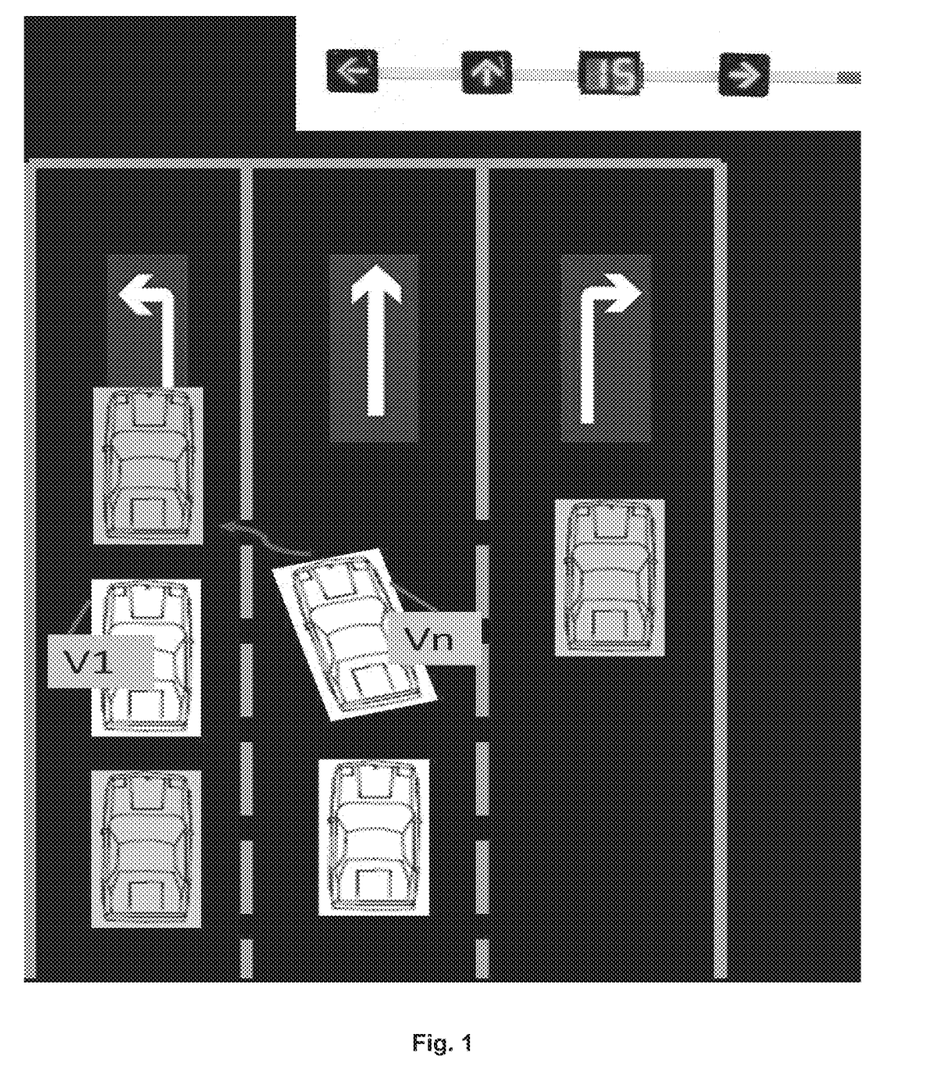
FIG. 1 illustrates a diagram of a scenario in which a method for requesting for a road right according to an embodiment of the present disclosure is applied.

FIG. 1 is a diagram of a scenario in which a method for requesting for a road right according to an embodiment of the present disclosure is applied. As shown in FIG. 1, when traffic congestion occurs in the front of a road where a vehicle Vn is located, and the vehicle needs to change to a lane on the left side, the vehicle Vn initiates a request for changing to the lane on the left side, searches vehicles in a predetermined area range according to a direction for the lane change request and positioning information, displays information of the searched vehicles, selects one or more vehicles including V1 automatically or through artificial assistance according to the display result, transmits a road right occupation request to the selected vehicle, and performs a lane change operation when the selected vehicle agrees with the road right occupation request. Here, the vehicle Vn which initiates the road right occupation request is referred to as a road right requesting vehicle, and the searched vehicles including V1 displayed are referred to as requested vehicles.

FIG. 1 is only an application scenario according to the embodiment of the present disclosure. A similar application scenario further comprises: a scenario in which a vehicle needs to change from an auxiliary road to a main road or change from a main road to an auxiliary road, or a vehicle travelling on a certain lane temporarily changes its destination, and the method for requesting for a road right according to the embodiment of the present disclosure is generally applicable to such a scenario in which a vehicle has a lane change demand, and details thereof will not be described here again.

The embodiments of the present disclosure provide a method for requesting for a road right, which is simpler to operate and easier to implement than the existing method of realizing lane change depending on experienced skills of drivers, solves the problem that it is difficult for drivers, particularly novice drivers, to realize lane change when a traffic congestion or other conditions occur, and alleviates the problem of traffic congestion caused by blind lane change of vehicles.

Figure 2:
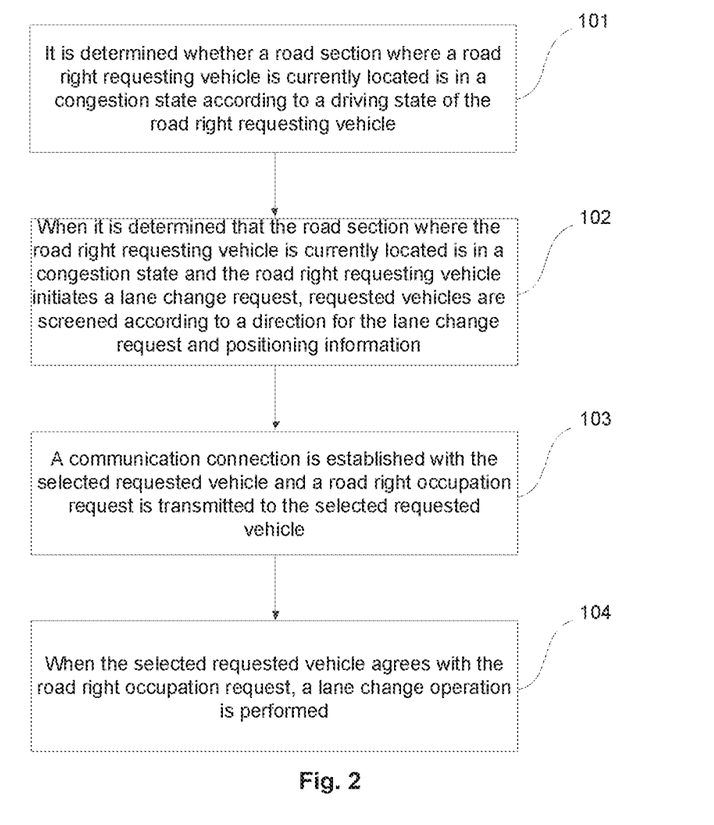
FIG. 2 illustrates a flowchart of a method for requesting for a road right according to an embodiment of the present disclosure.

FIG. 2 is a flowchart of a method for requesting for a road right according to an embodiment of the present disclosure. As shown in FIG. 2, the method comprises the following steps.

In 101, it is determined whether a road section where a road right requesting vehicle is currently located is in a congestion state according to a driving state of the road right requesting vehicle.

Here, the driving state comprises a speed of the vehicle in a certain period of time, and a road condition of the road section where the vehicle is located, and may further comprise a density of surrounding vehicles of the vehicle.

Further, the road condition comprises flatness and ruggedness conditions of a road. A vehicle-mounted imaging system which is built in the road right requesting vehicle may photograph a photo of the road, and an image sensor which is built in the road right requesting vehicle may detect photo information of the road and converts the photo information into digital information to be acquired according to flatness and ruggedness conditions of the road which is displayed in the photo information. Here, the flatness and ruggedness conditions of the road comprise: a degree of potholes of the road, a number of ramps and corners, etc., the digital information comprises: a good level, a general level, and a poor level; and the density of the vehicles comprises a number of vehicles per unit area. The vehicle-mounted imaging system which is built in the road right requesting vehicle may obtain a number of vehicles in a predetermined range through photographing, and an infrared sensor which is built in the road right requesting vehicle may detect the number information and convert the number information into digital information to be acquired, wherein the infrared sensor measures the number of surrounding vehicles using physical properties of infrared rays. The speed of the road right requesting vehicle may be detected by a speed sensor. Here, an operating principle of the speed sensor is as follows: when the vehicle is moving, a roller of the speed sensor rotates under the action of a friction force between a wheel of the vehicle and the speed sensor. In this case, a rotating pulse sensor mounted on the roller emits a series of pulses, wherein each of the pulses represents a certain distance value. A total distance value is calculated according to a number of the pulses, and the speed of the vehicle is measured according to the total distance value and duration of the emitted series of pulses, wherein the speed sensor is provided on the wheel of the vehicle.

The road right requesting vehicle determines whether the road section where the road right requesting vehicle is currently located is in a congestion state according to the obtained road condition information, the speed of the road right requesting vehicle in the certain period of time, and a value of the density of surrounding vehicles of the road right requesting vehicle. If the road condition is good and both the speed of the road right requesting vehicle in the certain period of time and the value of the density of surrounding vehicles of the road right requesting vehicle are within respective predetermined value ranges, it may be determined that the road section where the road right requesting vehicle is currently located is in a congestion state. On the contrary, if the road condition is poor or if one of the speed of the road right requesting vehicle in the certain period of time and the value of the density of surrounding vehicles of the road right requesting vehicle is not within the corresponding predetermined value range, it cannot be determined that the road section where the road right requesting vehicle is currently located is in a congestion state. In this regard, a specific policy for judging the congestion state is not limited in the present embodiment.

In 102, when it is determined that the road section where the road right requesting vehicle is currently located is in a congestion state and the road right requesting vehicle initiates a lane change request, requested vehicles are screened according to a direction for the lane change request and positioning information.

Here, the direction for the lane change request comprises: a leftward lane change direction or a rightward lane change direction, and the road right requesting vehicle may detect a turn-on signal of a leftward turning light or a rightward turning light through a light sensor which is built therein to obtain information of the leftward lane change direction or the rightward lane change direction, wherein the light sensor is composed of a light projector and a light receiver, and an operating principle of the light sensor is to focus light through a lens using the light projector and transmit the focused light to a lens of the light receiver, and then to a receiving sensor, which may convert the received light signal into an electrical signal. The positioning information is a position where the road right requesting vehicle is currently located. The position where the road right requesting vehicle is currently located may be obtained by receiving a signal from a positioning satellite in space through a GPS sensor and positioning the road right requesting vehicle through four-star rendezvous.

Further, the road right requesting vehicle may transmit a measurement signal to each of the requested vehicles through a displacement sensor which is built therein, calculate a time difference between a time when the measurement signal is transmitted and a time when a reflected echo signal is received, divide the time difference by 2, and then multiply the result by a speed of light to obtain a distance to the requested vehicle, so as to obtain position information of the requested vehicle.

The road right requesting vehicle selects one or more candidate requested vehicles within a predetermined range according to the obtained direction for the lane change request and positioning information of the road right requesting vehicle and the position information of the requested vehicles. Here, all vehicles within a searching range are referred to here as candidate requested vehicles, and the selected one or more candidate requested vehicles are referred to as requested vehicles.

In 103, a communication connection is established with the selected requested vehicle and a road right occupation request is transmitted to the selected requested vehicle.

Here, a manner of establishing a communication connection comprises, but not limited to, WIFI, Bluetooth, and a mobile network.

Here, the road right requesting vehicle may directly call the selected requested vehicle via voice through a communication connection established via the mobile network, and query for whether to agree to provide the road right. The selected requested vehicle answers the call and responds with information on agreeing or not agreeing to provide the road right via voice. Here, the voice call may be realized through a built-in communication account bound to the vehicle, or through an instant communication application bound to an owner of the vehicle, such as WeChat, QQ, etc.

The road right requesting vehicle may also transmit text information to the selected requested vehicle through a communication connection established via WIFI or Bluetooth, and the selected requested vehicle receives and reads the text information, and responds with "agree" or "disagree" via a text. The text information may be transmitted through a built-in communication account bound to the vehicle, or through an instant communication application bound to the owner of the vehicle, such as WeChat, QQ, etc.

In 104, when the selected requested vehicle agrees with the road right occupation request, a lane change operation is performed.

Here, when the selected requested vehicle provides response information indicating that it agrees to provide the road right, the selected requested vehicle waits in situ, and the road right requesting vehicle changes to a requested lane according to the direction for the lane change request.

It can be seen from the description of the above steps that the method for requesting for a road right according to the embodiment of the present disclosure mainly determines whether a road section where a road right requesting vehicle is currently located is in a congestion state, searches and screens requested vehicles within a predetermined range according to a direction for the lane change request and positioning information, to realize automatic searching and screening of the requested vehicles, and selects a requested vehicle having high score information, to ensure a success rate of a road right occupation request; and further establishes a communication connection with the selected requested vehicle, transmits a road right occupation request to the selected requested vehicle, performs a lane change operation when the selected requested vehicle agrees with the road right occupation request, to realize orderly lane change of the road right requesting vehicle, and then pays a fee in the occupation request to the selected requested vehicle to ensure security. The method for requesting for a road right realizes the orderly lane change of the road right requesting vehicle, avoids new traffic accidents caused by the seizure of the road right, solves the problem that it is difficult for the driver, especially the novice driver, to change a lane in the event of traffic congestion or other conditions, and alleviates the problem of traffic congestion caused by blind lane change of vehicles.

Figure 3:
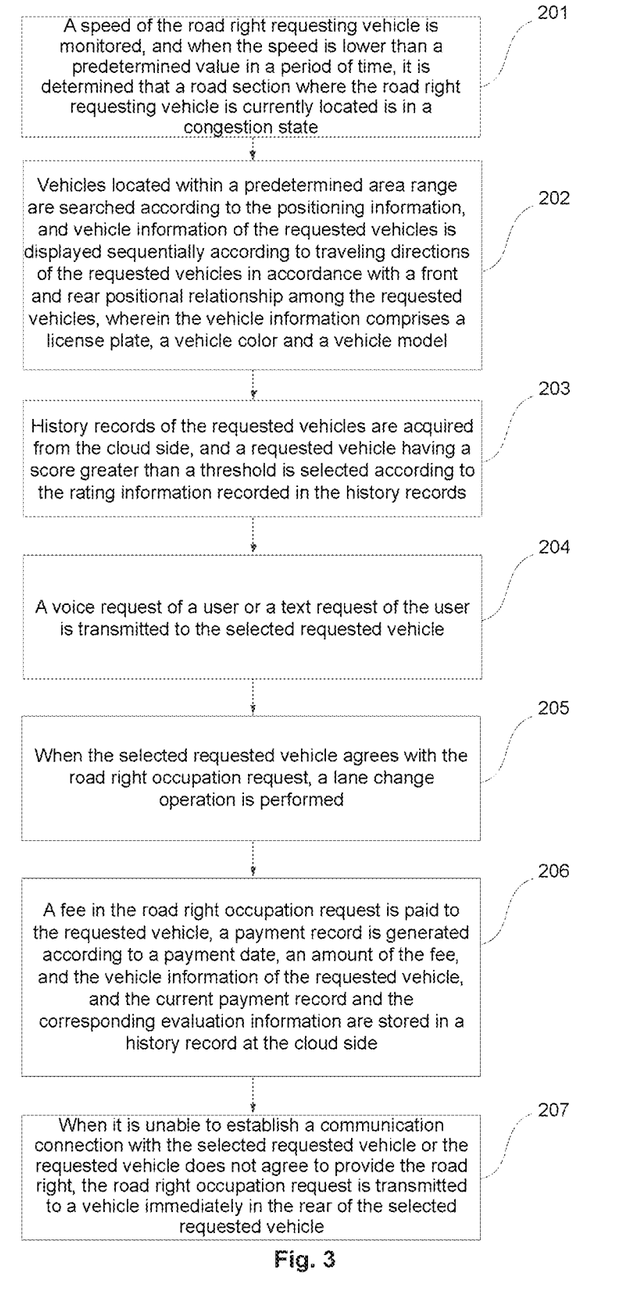
FIG. 3 illustrates a flowchart of another method for requesting for a road right according to an embodiment of the present disclosure.

Further, the embodiments of the present disclosure further provide another method for requesting for a road right, which realizes an autonomous lane change function of a vehicle. Specific steps are shown in FIG. 3, and are as follows.

In 201, a speed of the road right requesting vehicle is monitored, and when the speed is lower than a predetermined value in a period of time, it is determined that a road section where the road right requesting vehicle is currently located is in a congestion state.

In an example, when it is monitored that the speed of the road right requesting vehicle is less than 10 Km/h within 10 minutes, it needs to further consider a road condition of the road section where the road right requesting vehicle is located, a density of surrounding vehicles of the road right requesting vehicle, and a traveling speed of the road right requesting vehicle. When the road condition of the road section where the road right requesting vehicle is located is good, the density of the surrounding vehicles of the road right requesting vehicle is not more than 0.1 vehicle/m$^2$, and the speed is below 40 Km/h, it is determined that the road section where the road right requesting vehicle is currently located is in a congestion state.

In 202, vehicles located within a predetermined area range are searched according to the positioning information, and vehicle information of the requested vehicles is displayed sequentially according to traveling directions of the requested vehicles in accordance with a front and rear positional relationship among the requested vehicles, wherein the vehicle information comprises a license plate, a vehicle color and a vehicle model.

In this step, vehicles to which a road right occupation request may be initiated may be provided as requested vehicles to a driver of the road right requesting vehicle, wherein these vehicles should be located in a lane to which the road right requesting vehicle requests for changing its lane to, and current positions of these vehicles should be located in the rear of the position of the road right requesting vehicle. Here, "rear" is defined with reference to a current traveling direction of the vehicle.

It should be illustrated that these vehicles and the road right requesting vehicle are all in the same vehicle network, a data connection may be established among these vehicles, and each vehicle has a unique identifier in the vehicle network, wherein the identifier corresponds to the vehicle information of the vehicle.

In an example, when it is determined that the road section where the road right requesting vehicle is currently located is in a congestion state and the road right requesting vehicle needs to change its lane, a position where the road right requesting vehicle is currently located is determined, and requested vehicles are searched within a range having a radius not more than 100 m according to the positioning information. Further, vehicle information of vehicles which travel in the same direction as that of the road right requesting vehicle and are located in the rear of the road right requesting vehicle is displayed sequentially according to a lane change direction of the road right requesting vehicle and the traveling direction of the road right requesting vehicle.

In an example, if the road right requesting vehicle needs to change its lane to a lane on the left side, vehicle information of vehicles in a lane on the right side are not displayed for the purpose of reducing and optimizing the vehicle information.

In an example, if the road right requesting vehicle is traveling in a southward direction, vehicle information of vehicles traveling in a northward direction is not displayed for the purpose of reducing and optimizing the vehicle information.

Figure 4:
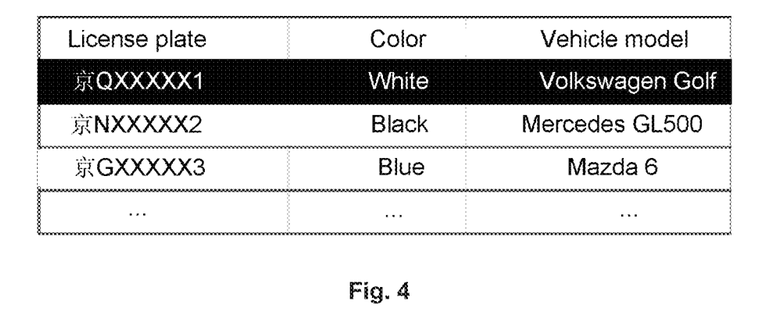
FIG. 4 illustrates a diagram of a display effect of vehicle information of requested vehicles according to an embodiment of the present disclosure.

In an example, a display result of the vehicle information of the requested vehicles within the searching range is as shown in FIG. 4, and the vehicle information of the requested vehicles is displayed sequentially from front to rear according to the front and rear positions of the requested vehicles to ensure selectivity of the requested vehicles. For example, the vehicle information may be: "京 QXXXXX1, white, Volkswagen Golf", "京 NXXXXX2, black, Mercedes GL500" and "京 GXXXXX3, blue, Mazda 6". The display effect of the vehicle information is as shown in FIG. 4.

In an example, the road right requesting vehicle may also display the vehicle information of the requested vehicles in order from high to low according to rating information corresponding to the requested vehicles, to realize the effect of optimizing the vehicle information. Here, the rating information is stored in a database at a cloud side, and may be acquired from the database at the cloud side by transmitting query request information. Here, the rating information is rating information made by other road right requesting vehicles according to a number of times the requested vehicle agrees with a road right occupation request, a number of times the requested vehicle rejects a road right occupation request, a payment amount, etc. before the current road right occupation request is transmitted to the requested vehicle. Here, the rating information may be one star, two stars, etc., up to five stars, or a number between 1-10, and the larger a ratio between the number of times the requested vehicle agrees with a road right occupation request relative to the number of times the requested vehicle rejects a road right occupation request, the higher the rating.

In 203, history records of the requested vehicles are acquired from the cloud side, and a requested vehicle having a score greater than a threshold is selected according to the rating information recorded in the history records.

Here, the history record is a date when the requested vehicle agrees with a road right occupation request, a date when the requested vehicle rejects a road right occupation request, a payment amount, a number of times the requested vehicle agrees with a road right occupation request, a number of times the requested vehicle rejects a road right occupation request, corresponding rating information etc., for reference by subsequent road right requesting vehicles.

In an example, the history records of the requested vehicles are stored in the database at the cloud side, and the road right requesting vehicle may query for the history records from the database at the cloud side according license plates of the requested vehicles, and select a requested vehicle having rating information not less than four stars or having a score not less than 8 to increase the success rate of obtaining the road right.

In 204, a voice request of a user or a text request of the user is transmitted to the selected requested vehicle.

In an example, the road right requesting vehicle may transmit a voice request of a user to the selected requested vehicle, and when the requested vehicle receives the voice information and responds with "agree" via voice, it indicates that the requested vehicle agrees with the road right occupation request. Here, content of the voice request may comprise: consultation about whether the requested vehicle agrees to provide the road right, and fee information required to be paid for acquiring the road right etc.

In another example, the road right requesting vehicle may also transmit a text request of the user to the selected requested vehicle, and when the selected requested vehicle receives the text information and responds with "agree" via a text, it also indicates that the requested vehicle agrees with the road right occupation request. Here, the text request may comprise: a fee required to be paid to the requested vehicle by the road right requesting vehicle to request for the road right.

In another example, the voice request or the text request may not comprise the fee information paid to the requested vehicle. When the requested vehicle disagrees with the road right occupation request, the request may then be transmitted again along with the fee information.

In another example, an upper limit value of the fee paid to the requested vehicle may be set to prevent malicious payments from occurring between the road right requesting vehicle and the requested vehicle.

In 205, when the selected requested vehicle agrees with the road right occupation request, a lane change operation is performed.

In an example, when the selected requested vehicle provides response information indicating that it agrees to provide the road right, the requested vehicle waits in situ, and the road right requesting vehicle performs the lane change operation, which realizes an orderly lane change operation of the road right requesting vehicle without depending on the driving skills of the driver.

In another example, if no relevant vehicle information is searched within a range having a radius not more than 100 m around the road right requesting vehicle, the driver needs to determine whether to perform the lane change operation according to practical situations.

It can be known from the description of the above steps that, the method for requesting for a road right makes it easy for a driver, especially a novice driver, to perform the lane change operation, which solves the problem that it is difficult for the driver, especially the novice driver, to realize the lane change operation in the event of traffic congestion or other conditions, alleviates the degree of congestion when traffic congestion occurs to a certain extent, and reduces the probability of traffic congestion.

In 206, a fee in the road right occupation request is paid to the requested vehicle, a payment record is generated according to a payment date, an amount of the fee, and the vehicle information of the requested vehicle, and the current payment record and the corresponding evaluation information are stored in a history record at the cloud side.

In an example, after the payment record is generated, the road right requesting vehicle and the requested vehicle may evaluate the current payment record for each other, to avoid a situation in which there is a loss for the road right requesting vehicle caused by a condition where a user has completed the payment but the requested vehicle has not provided the road right before the road right requesting vehicle performs the lane change operation, thereby ensuring fairness.

In 207, when it is unable to establish a communication connection with the selected requested vehicle or the requested vehicle does not agree to provide the road right, the road right occupation request is transmitted to a vehicle immediately in the rear of the selected requested vehicle.

Here, the rear vehicle is defined according to driving directions of the road right requesting vehicle and the requested vehicle, and if the road right requesting vehicle is unable to establish a communication connection with the selected requested vehicle or the requested vehicle does not agree to provide the road right in a predetermined period of time, the road right requesting vehicle transmits the road right occupation request to a vehicle immediately in the rear of the selected requested vehicle according to the displayed vehicle information, so as to increase the probability of success of the lane change demand.

Figure 5:
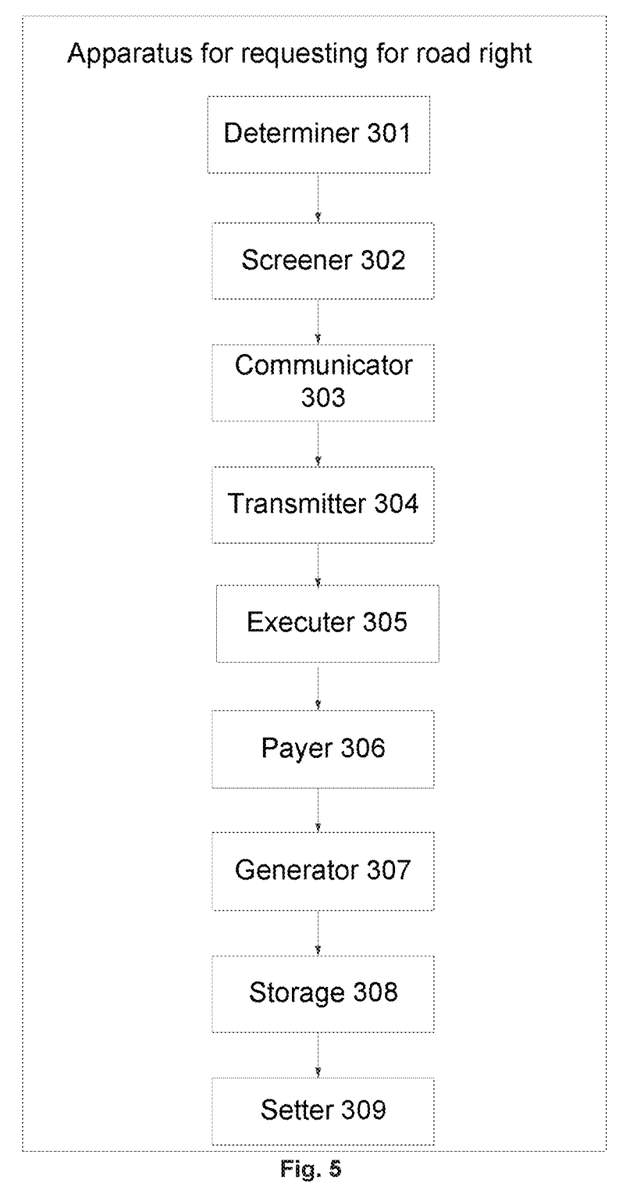
FIG. 5 illustrates a constitutional structural diagram of an apparatus for requesting for a road right according to an embodiment of the present disclosure.

Further, in correspondence with the method for requesting for a road right according to the above embodiments, the embodiments of the present disclosure further provide an apparatus for requesting for a road right to execute the method for requesting for a road right. A specific structure of the apparatus is shown in FIG. 5, and comprises:

a determiner 301 configured to determine whether a road section where a road right requesting vehicle is currently located is in a congestion state according to a driving state of the road right requesting vehicle;

a screener 302 configured to, when it is determined that the road section where the road right requesting vehicle is currently located is in a congestion state and the road right requesting vehicle initiates a lane change request, screen requested vehicles according to a direction for the lane change request and positioning information;

a communicator 303 configured to establish a communication connection with a selected requested vehicle;

a transmitter 304 configured to transmit a road right occupation request to the selected requested vehicle; and an executer 305 configured to perform a lane change operation when the selected requested vehicle agrees with the road right occupation request.

Figure 6:
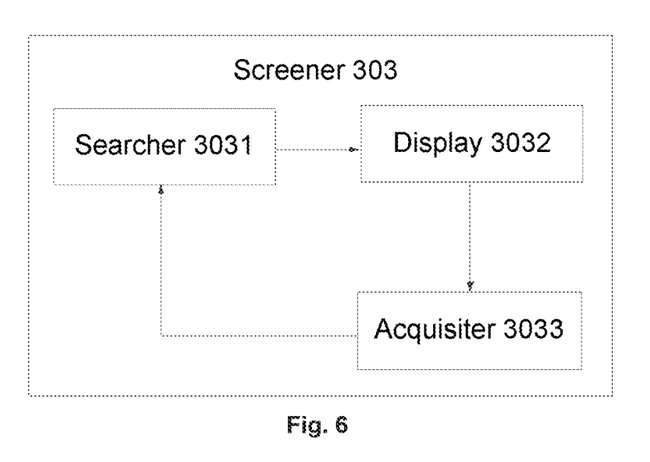
FIG. 6 illustrates a constitutional structural diagram of a screener in an apparatus for requesting for a road right according to an embodiment of the present disclosure.

In an example, the screener 303 may comprise:

a searcher 3031 configured to search vehicles located within a predetermined area range according to the positioning information; and a display 3032 configured to sequentially display vehicle information of the requested vehicles according to traveling directions of the requested vehicles in accordance with a front and rear positional relationship among the requested vehicles, wherein the vehicle information comprises a license plate, a vehicle color, and a vehicle type.

In an example, the screener 302 may further comprise:

an acquiser 3033 configured to acquire history records of the requested vehicles from the cloud side, and select a requested vehicle having a score greater than a threshold according to rating information recorded in the history records.

Here, a constitutional structure of the screener is shown in FIG. 6.

In an example, the apparatus for requesting for a road right may further comprise:

a payer 306 configured to pay a fee in the road right occupation request to the selected requested vehicle after the selected requested vehicle agrees with the road right occupation request and the road right requesting vehicle performs the lane change operation;

a generator 307 configured to generate a payment record according to a payment date, an amount of the fee, and the vehicle information of the selected requested vehicle;

a storage 308 configured to store the payment record and corresponding evaluation information in a history record at a cloud side, wherein the evaluation information comprises rating information of the road right requesting vehicle and the selected requested vehicle; and a setter 309 configured to set an upper limit value of the fee paid to the selected requested vehicle.

In an example, the determiner 301 is further configured to:

monitor a speed of the road right requesting vehicle, and when the speed is lower than a predetermined value for a period of time, determine that the road section where the road right requesting vehicle is currently located is in a congestion state.

In an example, the communicator 303 is further configured to:

when a communication connection cannot be established with the selected requested vehicle or the selected requested vehicle does not agree to provide the road right, transmit the road right occupation request to a vehicle immediately in the rear of the selected requested vehicle.

It can be seen from the description of the constitutional structure that the apparatus for requesting for a road right according to the embodiment of the present disclosure mainly realizes screening and automatic selection of requested vehicles through a function of screening requested vehicles of the screener in the apparatus for requesting for a road right, a function of establishing a communication connection with a selected requested vehicle of the communicator in the apparatus for requesting for a road right, and a function of transmitting a road right occupation request to the selected requested vehicle of the transmitter in the apparatus for requesting for a road right, so that the road right requesting vehicle realizes the lane change demand. This solves the problem that it is difficult for a driver, especially a novice driver, to change its lane in the event of traffic congestion or other conditions, and alleviates the problem of traffic congestion caused by the blind lane change of the vehicles. The apparatus for requesting for a road right is easy to operate and has certain practicability and popularity.

In summary, the method and apparatus for requesting for a road right according to the embodiments of the present disclosure mainly determine whether a road section where a road right requesting vehicle is currently located is in a congestion state, search and screen requested vehicles within a predetermined range according to a direction for the lane change request and positioning information, to realize automatic searching and screening of the requested vehicles, and select a requested vehicle having high score information, to ensure a success rate of a road right occupation request; and further establish a communication connection with the selected requested vehicle, transmit a road right occupation request to the selected requested vehicle, perform a lane change operation when the selected requested vehicle agrees with the road right occupation request, and then pay a fee in the occupation request to the selected requested vehicle to ensure security of the payment. The method for requesting for a road right realizes the orderly lane change of the road right requesting vehicle, avoids new traffic accidents caused by the seizure of the road right, solves the problem that it is difficult for a driver, especially a novice driver, to change its lane in the event of traffic congestion or other conditions, and alleviates the problem of traffic congestion caused by blind lane change of vehicles.

Figure 7:
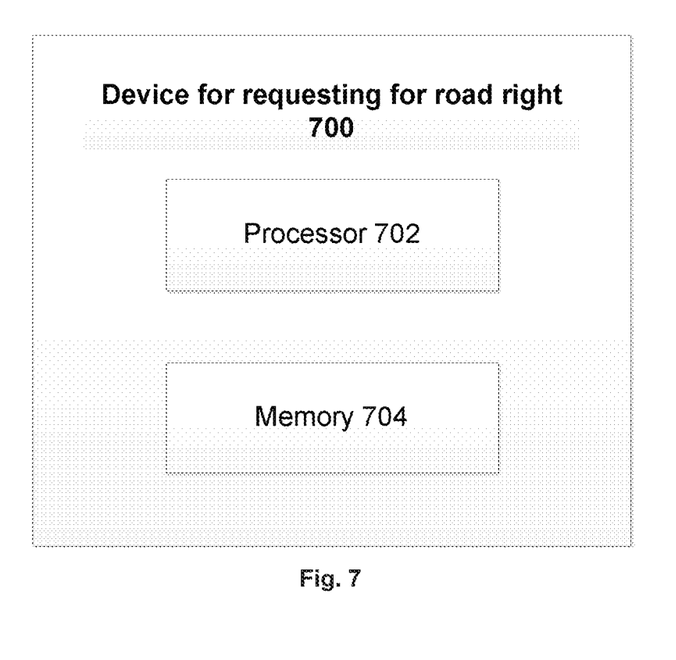
FIG. 7 illustrates a structural diagram of a device for requesting for a road right according to an embodiment of the present disclosure.

The embodiments of the present disclosure further provide a device for requesting for a road right. A structural block diagram of the device is shown in FIG. 7, and comprises a processor 702 and a memory 704. It should be illustrated that the structure of the device for requesting for a road right shown in FIG. 7 is merely exemplary and not restrictive, and the device for requesting for a road right may have other components according to practical application needs.

In an embodiment of the present disclosure, the processor 702 and the memory 704 may communicate with each other directly or indirectly. Communication between components such as the processor 702 and the memory 704 etc. may be realized through a connection via a network. The network may comprise a wireless network, a wired network, and/or any combination of the wireless network and the wired network. The network may comprise a local area network, the Internet, a telecommunication network, an Internet and/or telecommunication network based Internet of Things, and/or any combination of the above networks, etc. The wired network may realize communication by means of transmission through a twisted pair, a coaxial cable or an optical fiber etc., for example, and the wireless communication network may use a communication manner such as a 3G/4G/5G mobile communication network, Bluetooth, Zigbee or WiFi etc. A type and a function of the network may not be limited here in the present disclosure.

The processor 702 may control other components in the device for requesting for a road right to perform desired functions. The processor 702 may be a device having data processing capabilities and/or program execution capabilities such as a Central Processing Unit (CPU), or a Graphics Processing Unit (GPU), etc. The CPU may have X86 or ARM architecture etc. The GPU may be integrated directly onto a motherboard alone or may be built in a north bridge chip of the motherboard. The GPU may also be built in the CPU.

The memory 704 may comprise any combination of one or more computer program products, which may comprise various forms of computer readable storage media, such as volatile memory and/or nonvolatile memory. The volatile memory may comprise, for example, a Random Access Memory (RAM) and/or a cache etc. The non-volatile memory may comprise, for example, a Read Only Memory (ROM), a hard disk, an Erasable Programmable Read Only Memory (EPROM), a portable Compact Disk-Read Only Memory (CD-ROM), a USB memory, a flash memory, etc.

One or more computer readable codes or instructions may be stored on the memory 704, and the processor 702 may execute the computer instructions to implement the method for requesting for a road right described above. Detailed description of the processing of the method for requesting for a road right can be known with reference to the related description of the method for requesting for a road right according to the embodiments of the present disclosure, and details thereof will not be described here again. Various application programs and various data, such as image data sets and various data used and/or generated by the application programs, etc., may also be stored in the computer readable storage medium. In the above embodiments, the descriptions of the various embodiments have different points of focus, and some portions which are not described in detail in a certain embodiment can be known with reference to the related descriptions of other embodiments.

It can be understood that related features in the above method and apparatus can be known with reference to each other. In addition, "first", "second", etc. in the above embodiments are used to distinguish the embodiments from each other, and do not represent preferred and non-preferred embodiments.

It can be clearly understood by those skilled in the art that for the convenience and brevity of the description, specific operating processes of the system, the apparatus and the element described above can be known with reference to the corresponding processes in the method embodiment described above, and details thereof will not be described here again.

Algorithms and displays provided here are not inherently related to any particular computer, virtual system, or other device. Various general purpose systems may also be used based on the teachings here. A structure required to construct such a system is apparent from the above description. Further, the present disclosure is not directed to any particular programming language. It is to be understood that the content of the present disclosure described here may be implemented in a variety of programming languages, and the description of the specific language is described above to disclose the preferred embodiments of the present disclosure.

It will be appreciated by those skilled in the art that embodiments of the present application can be provided as methods, systems, or computer program products. Accordingly, the present application may take a form of a pure hardware embodiment, a pure software embodiment, or a combination of software and hardware aspects. Moreover, the present application may take a form of a computer program product implemented on one or more computer usable storage media (including but not limited to disk storage, CD-ROM, optical memory, etc.) in which computer usable program codes are included.

The present application is described with reference to the flowcharts and/or block diagrams of the methods, devices (systems) and computer program products according to the embodiments of the present application. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed in the computer or other programmable devices provide a step of implementing functions specified in one or more flows in the flowcharts and/or one or more blocks in the block diagrams.

In a typical configuration, a computing device comprises one or more processors (for example, CPUs), input/output interfaces, network interfaces, and memories.

The memory may comprise a non-persistent memory, a RAM, and/or a non-volatile memory, such as a ROM or a flash RAM, in a computer readable medium. The memory is an example of the computer readable medium.

The computer readable media, including both permanent and non-persistent media, and removable and non-removable media, may store information through any method or technology. The information may be computer readable instructions, data structures, program modules, or other data. Examples of the computer storage medium comprise, but not limited to, a Phase Change Memory (PRAM), a Static Random Access Memory (SRAM), a Dynamic Random Access Memory (DRAM), other types of RAMs, ROMs, an Electrically Erasable Programmable Read Only Memory (EEPROM), a flash memory or other memory technology, a Compact Disk-Read Only Memory (CD-ROM), a Digital Versatile Disk (DVD) or other optical storage, a cartridge-type magnetic tape, a magnetic tape storage or other magnetic storage devices or any other non-transportable media for storing information which may be accessed by a computing device. As defined herein, the computer readable medium does not comprise transitory media, such as modulated data signals and carriers.

It is also to be illustrated that the terms "comprises" or "comprising" or any other variations are intended to encompass a non-exclusive inclusion, so that a process, method, article, or device, including a series of elements, not only comprises those elements, but also comprises other elements which are not explicitly listed, or elements which are inherent to such a process, method, article, or device. An element defined by a phrase "comprising a . . . " without further limitation does not exclude the existence of additional identical elements in the process, method, article, or device which comprises the element.

It will be appreciated by those skilled in the art that embodiments of the present application can be provided as methods, systems, or computer program products. Accordingly, the present application may take a form of a pure hardware embodiment, a pure software embodiment, or a combination of software and hardware aspects. Moreover, the present application may take a form of a computer program product implemented on one or more computer usable storage media (including but not limited to disk storage, CD-ROM, optical memory, etc.) in which computer usable program codes are included.

The above is only the embodiments of the present application and is not intended to limit the present application. Various changes and modifications can be made to the present application by those skilled in the art. Any modifications, equivalents, improvements, etc. made within the spirit and scope of the present application are intended to be included within the scope of the claims of the present application.

We claim:

1. A method for requesting for a road right, comprising:
    judging whether a road section where a road right requesting vehicle is currently located is in a congestion state according to a driving state of the road right requesting vehicle;
    when it is determined that the road section where the road right requesting vehicle is currently located is in a congestion state and the road right requesting vehicle initiates a lane change request, screening requested vehicles according to a direction for the lane change request and positioning information;
    establishing a communication connection with a selected requested vehicle and transmitting a road right occupation request to the selected requested vehicle; and
    performing a lane change operation when the selected requested vehicle agrees with the road right occupation request,
    wherein transmitting a road right occupation request to the selected requested vehicle comprises:
    transmitting a voice request of a user to the selected requested vehicle; and
    transmitting a text request of the user to the selected requested vehicle, wherein the text request comprises a fee paid by the road right requesting vehicle for requesting for the road right,
    wherein after performing a lane change operation when the selected requested vehicle agrees with the road right occupation request, the method further comprises:
    paying the fee in the road right occupation request to the selected requested vehicle, and generating a payment record according to a payment date, an amount of the fee, and vehicle information of the requested vehicle; and
    storing the payment record and corresponding evaluation information in a history record at a cloud side, wherein the evaluation information comprises rating information of the road right requesting vehicle and the selected requested vehicle, and
    wherein screening requested vehicles according to a direction for the lane change request and positioning information further comprises:
    acquiring history records of the selected requested vehicles from the cloud side, and selecting a requested vehicle having a score greater than a threshold according to rating information recorded in the history records.

2. The method according to claim 1, wherein screening requested vehicles according to a direction for the lane change request and positioning information comprises:
    searching vehicles located within a predetermined area range according to the positioning information; and
    sequentially displaying vehicle information of the requested vehicles according to traveling directions of the requested vehicles in accordance with a front and rear positional relationship among the requested vehicles, wherein the vehicle information comprises a license plate, a vehicle color, and a vehicle type.

3. The method according to claim 1, wherein judging whether a road section where a road right requesting vehicle is currently located is in a congestion state comprises:
    monitoring a speed of the road right requesting vehicle, and when the speed is lower than a predetermined value for a period of time, determining that the road section where the road right requesting vehicle is currently located is in a congestion state.

4. The method according to claim 1, wherein when a communication connection cannot be established with the selected requested vehicle or the selected requested vehicle does not agree to provide the road right, the method further comprises:
    transmitting the road right occupation request to a vehicle immediately in the rear of the selected requested vehicle.

5. The method according to claim 1, further comprising:
    setting an upper limit value of the fee paid to the selected requested vehicle.

6. A device for requesting for a road right, comprising:
    a processor; and
    a memory coupled to the processor and storing instructions which, when executed on the processor, cause the processor to be configured to:
    determine whether a road section where a road right requesting vehicle is currently located is in a congestion state according to a driving state of the road right requesting vehicle;
    when it is determined that the road section where the road right requesting vehicle is currently located is in a congestion state and the road right requesting vehicle initiates a lane change request, screen requested vehicles according to a direction for the lane change request and positioning information;
    establish a communication connection with a selected requested vehicle and transmit a road right occupation request to the selected requested vehicle; and
    perform a lane change operation when the selected requested vehicle agrees with the road right occupation request,
    wherein the processor is further configured to:
    transmit a voice request of a user to the selected requested vehicle; and
    transmit a text request of the user to the selected requested vehicle, wherein the text request comprises a fee paid by the road right requesting vehicle for requesting for the road right,
    wherein the processor is further configured to:
    pay the fee in the road right occupation request to the selected requested vehicle, and generate a payment record according to a payment date, an amount of the fee, and vehicle information of the requested vehicle; and store the payment record and corresponding evaluation information in a history record at a cloud side, wherein the evaluation information comprises rating information of the road right requesting vehicle and the selected requested vehicle, and wherein the processor is further configured to:

acquire history records of the selected requested vehicles from the cloud side, and select a requested vehicle having a score greater than a threshold according to rating information recorded in the history records.

7. The device according to claim 6, wherein the processor is further configured to:

search vehicles located within a predetermined area range according to the positioning information; and sequentially display vehicle information of the requested vehicles according to traveling directions of the requested vehicles in accordance with a front and rear positional relationship among the requested vehicles, wherein the vehicle information comprises a license plate, a vehicle color, and a vehicle type.

8. The device according to claim 6, wherein the processor is further configured to:

monitor a speed of the road right requesting vehicle, and when the speed is lower than a predetermined value for a period of time, determine that the road section where the road right requesting vehicle is currently located is in a congestion state.

9. The device according to claim 6, wherein the processor is further configured to:

transmit the road right occupation request to a vehicle immediately in the rear of the selected requested vehicle.

10. The device according to claim 6, wherein the processor is further configured to:

set an upper limit value of the fee paid to the selected requested vehicle.

\* \* \* \* \*